United States Patent
Wen et al.

(10) Patent No.: US 12,512,758 B2
(45) Date of Patent: Dec. 30, 2025

(54) CHARGING CIRCUIT AND CHARGING SYSTEM

(71) Applicant: Nanjing Silergy Micro Technology Co., Ltd., Nanjing (CN)

(72) Inventors: Sihua Wen, Nanjing (CN); Zhao Lu, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 954 days.

(21) Appl. No.: 17/582,233

(22) Filed: Jan. 24, 2022

(65) Prior Publication Data

US 2022/0255433 A1    Aug. 11, 2022

(30) Foreign Application Priority Data

Feb. 5, 2021   (CN) .......................... 202110160944.5

(51) Int. Cl.
| | |
|---|---|
| H02J 7/04 | (2006.01) |
| H02J 7/00 | (2006.01) |
| H02M 3/07 | (2006.01) |
| H02M 3/158 | (2006.01) |
| H05B 45/3725 | (2020.01) |

(52) U.S. Cl.
CPC ......... *H02M 3/1582* (2013.01); *H02J 7/0045* (2013.01); *H02J 7/00714* (2020.01); *H02M 3/07* (2013.01); *H05B 45/3725* (2020.01)

(58) Field of Classification Search
None
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 9,325,254 B2 | 4/2016 | Deng et al. |
| 9,331,588 B2 | 5/2016 | Chen |
| 9,488,680 B2 | 11/2016 | Xu |
| 10,547,241 B1* | 1/2020 | Li ....................... H02M 3/1588 |
| 10,554,061 B2 | 2/2020 | Liu et al. |
| 2014/0078789 A1 | 3/2014 | Li et al. |
| 2014/0239934 A1 | 8/2014 | Zhang |
| 2015/0160270 A1 | 6/2015 | Shi et al. |
| 2015/0280578 A1 | 10/2015 | Huang et al. |
| 2018/0341309 A1* | 11/2018 | Sporck ................ G06F 13/4295 |
| 2021/0359606 A1* | 11/2021 | Han .................... H02M 1/0054 |

FOREIGN PATENT DOCUMENTS

| | | |
|---|---|---|
| CN | 111049203 A | 4/2020 |
| WO | 2020169037 A1 | 8/2020 |

OTHER PUBLICATIONS

First Office Action, translated, SIPO, Jul. 15, 2024.

* cited by examiner

*Primary Examiner* — Arun C Williams

(57) ABSTRACT

A charging circuit can include: a first port for receiving a first input source; a second port coupled to a second input source or an external device; and a power stage circuit configured to operate as a charge pump in a first state, and to operate as a hybrid switching converter in a second state, where the hybrid switching converter and the charge pump share at least part of a plurality of power switches.

20 Claims, 9 Drawing Sheets

CHARGING CIRCUIT AND CHARGING SYSTEM

RELATED APPLICATIONS

This application claims the benefit of Chinese Patent Application No. 202110160944.5, filed on Feb. 5, 2021, which is incorporated herein by reference in its entirety.

FIELD OF THE INVENTION

The present invention generally relates to the field of power electronics, and more particularly to charging circuits and systems.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Batteries in portable devices can be charged from a variety of power sources, such as adapters and wireless power sources. A buck charger is a fairly common battery charger topology that converts a DC input voltage to a DC output voltage. A feedback loop is required in the buck charger to control the switching time of the power switch in the buck circuit, in order to maintain a stable output current or voltage required for battery charging. However, the efficiency usually drops when the input voltage of the buck charger is much higher than the battery voltage. Charge pump circuits (e.g., switching capacitor voltage converters) are more efficient than buck chargers when the voltage of the input source is much higher than the battery voltage. However, since the input voltage and battery voltage cannot maintain a fixed ratio during the charging process, a controller may be required to monitor the battery voltage and adjust the voltage of the input source (e.g., an adapter), which increases the control complexity, in order to realize battery charging.

Figure 1:
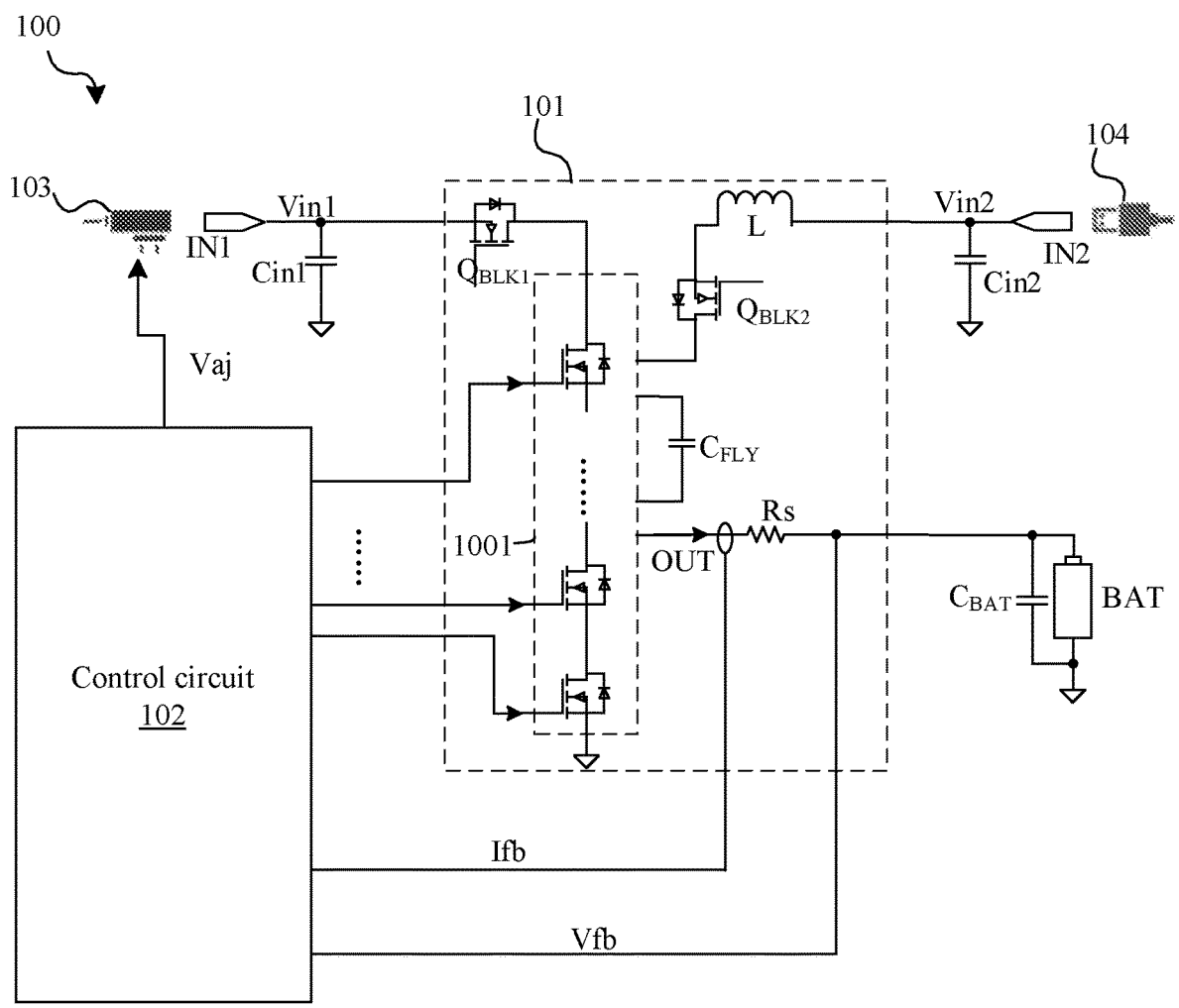
FIG. 1 is a schematic circuit diagram of a first example charging system, in accordance with embodiments of the preset invention.

Referring now to FIG. 1, shown is a schematic circuit diagram of a first example charging system, in accordance with embodiments of the preset invention. In this particular example, charging system 100 can include charging circuit 101, control circuit 102, and battery BAT. Charging circuit 101 can include ports IN1 and IN2 and a power stage circuit, where port IN1 receives a first input source and port IN2 receives a second input source or is connected to an external device (e.g., earphones). In this embodiment, the first input source can be an adjustable input source to generate adjustable voltage Vin1 at port IN1, and the second input source may be a fixed input source to generate fixed voltageVin2 at port IN2. Output terminal OUT of the power stage circuit can be coupled to battery BAT.

In one embodiment, the charging system can also include adapter 103 connected to port IN1, and USB power source 104 connected to port IN2. Adapter 103 can generate adjustable voltage Vin1 at port IN1 to charge battery BAT via the power stage circuit, and USB power source 104 can generate fixed voltage Vin2 at port IN2 to charge battery BAT via the power stage circuit. It should be understood that other types of input sources are applicable in certain embodiments. In addition, the charging system can also include input capacitors Cin1 and Cin2. Input capacitor Cin1 can connect to port IN1, input capacitor Cin2 can connect to port IN2. In another example, the charging system can also include an external device, and port IN2 can connect to the external device, such that battery BAT is discharged to charge the battery in the external device.

In particular embodiments, the power stage circuit can operate as a charge pump in a first state, and operate as a hybrid switching converter in a second state, where the hybrid switching converter and the charge pump share at least part of the power switches. The first state is that port IN1 is connected to the first input source (adjustable input source) to charge battery BAT. The second state can be divided into two modes. The first mode is that port IN2 is connected to the second input source (fixed input source) to charge battery BAT, and the hybrid switching converter may operate in a buck mode at this time. The second mode can be that port IN2 is connected to an external device to charge the external device by battery BAT, and the hybrid switching converter may operate in a boost mode at this time.

For example, the power stage circuit can include switch network 1001, which can include a plurality of power switches that are coupled between port IN1 and the reference ground to form a plurality of switch intermediate nodes. The power stage circuit also can include at least one flying capacitor, and the two ends of each flying capacitor may respectively be connected to the corresponding switch intermediate nodes. The flying capacitor(s) and switch network 1001 may form the charge pump. In this embodiment, the charge pump may have a fixed voltage conversion ratio. Here, the output voltage or output current (e.g., the voltage or current at output terminal OUT) generated by the charge pump can be adjusted by adjusting voltage Vin1 generated by the first input source. In addition, battery BAT and capacitor $C_{BAT}$ can connect in parallel between output terminal OUT and the reference ground.

It should be understood that depending on the number and/or the connection manner of the power switches and the flying capacitor(s) in switch network 1001, output voltages with different voltage conversion ratios can be generated at output terminal OUT. In particular embodiments, any suitable switching capacitor topology can be utilized as the charge pump. The power stage circuit can also include inductor L, which can connect between port IN2 and the corresponding power switch in switch network 1001. Inductor L, the flying capacitor(s), and at least part of the power switches in switch network 1001 may form the hybrid switching converter. The output voltage or output current generated by the hybrid switching converter can be adjusted by adjusting the duty cycle of the power switches in the hybrid switching converter.

Charging circuit 101 can also include switches $Q_{BLK1}$ and $Q_{BLK2}$. When the power stage circuit operates as the charge pump in the first state, switch $Q_{BLK1}$ can be controlled to be in an on state to receive the first input source, while the switch $Q_{BLK2}$ can be controlled to be in an off state, in order to prevent voltage Vin1 generated by the first input source or other voltages in charging circuit 101 from being transmitted to port IN2 and affecting the power source or device connected to port IN2. When the power stage circuit operates as the hybrid switching converter in the second state, switch $Q_{BLK2}$ can be controlled to be in an on state to receive the second input source, while switch $Q_{BLK1}$ can be controlled to be in an off state, in order to prevent voltage VIN2 generated by the second input source or other voltages in charging circuit 101 from being transmitted to port IN1 and affecting the power source or device connected to port IN1.

Control circuit 102 can generate a corresponding control signal according to current feedback signal Ifb representing the output current or voltage feedback signal Vfb representing the output voltage to control the operating state of the power stage circuit, in order to meet the charging and discharging requirements. For batteries, there are generally two modes for charging: constant current charging mode, and constant voltage charging mode. For example, when the voltage of battery BAT is lower than a first threshold (e.g., 3V), battery BAT may need to be charged at the constant current charging mode with a smaller current. When the voltage of battery BAT is higher than the first threshold, battery BAT can be charged at the constant current charging mode with a larger current. When the voltage of battery BAT is higher than a second threshold (e.g., 4.2V), battery BAT can be fully charged, and battery BAT may start to enter the constant voltage charging mode.

In the example of FIG. 1, sampling resistor Rs can connect in series between output terminal OUT of the power stage circuit and battery BAT. Current feedback signal Ifb can be obtained by obtaining the voltage difference between the two ends of sampling resistor Rs, and different desired charging currents can be achieved by setting different current reference signals. In addition, voltage feedback signal Vfb can be obtained by sampling the voltage across capacitor $C_{BAT}$, in order to perform constant voltage charging control on battery BAT.

Figure 2:
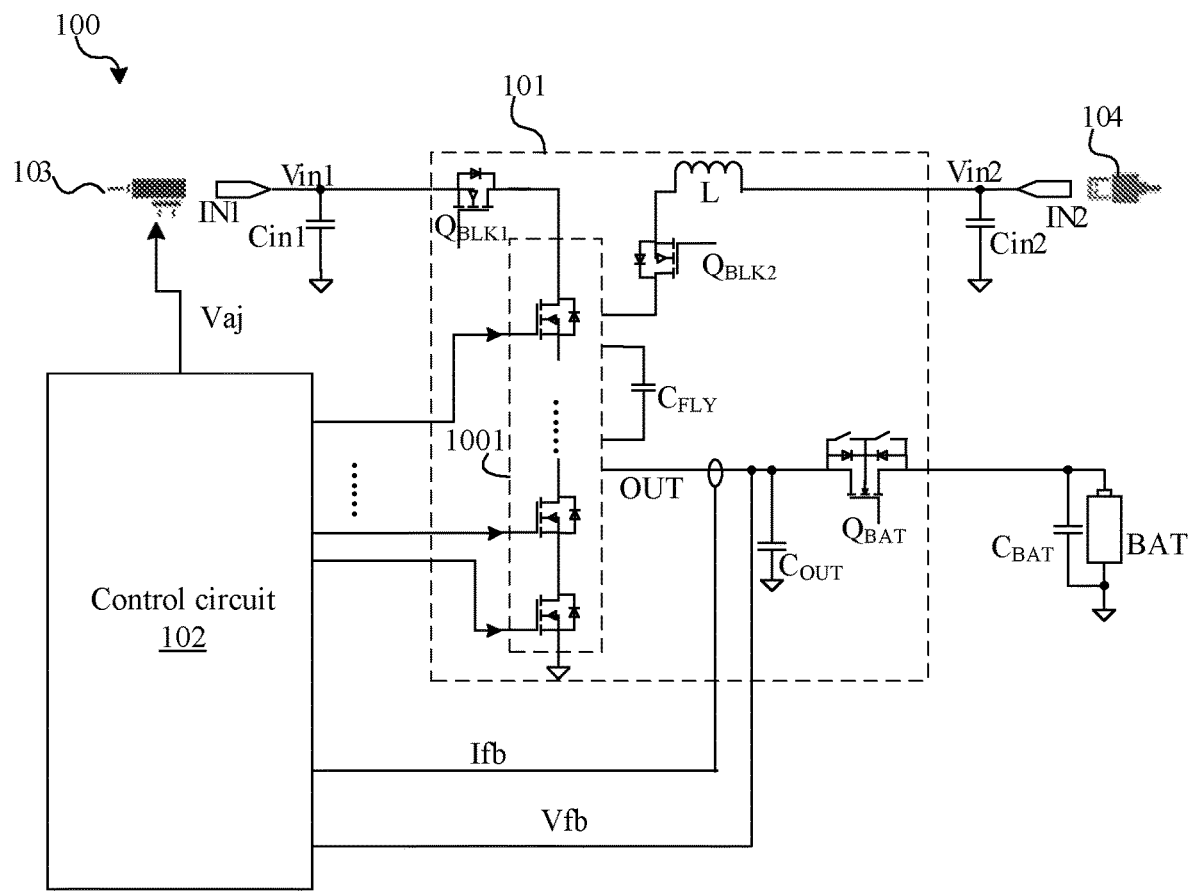
FIG. 2 is a schematic circuit diagram of a second example charging system, in accordance with embodiments of the present invention.

Referring now to FIG. 2, shown is a schematic circuit diagram of a second example charging system, in accordance with embodiments of the present invention. In this example charging system, charging circuit 101 can also include switch $Q_{BAT}$ connected in series between output terminal OUT of the power stage circuit and battery BAT. For example, switch $Q_{BAT}$ can be a MOSFET with a variable substrate; that is, the direction of the anode of its body diode can be selectively changed to adapt to different situations. Also, the current sampling can be performed by using switch $Q_{BAT}$ to replace sampling resistor Rs in FIG. 1. In this example, when the voltage of battery BAT is higher than the first threshold, switch $Q_{BAT}$ can be controlled to be in a fully conducting state. When battery BAT is not fully charged, current feedback signal Ifb can be obtained by sampling the current of switch $Q_{BAT}$, in order to perform constant current charging on battery BAT. When battery BAT is fully charged, voltage feedback signal Vfb can be obtained by obtaining the voltage of the first terminal (e.g., at output terminal OUT) of switch $Q_{BAT}$, in order to perform constant voltage charging on battery BAT.

In addition, when the voltage of battery BAT is lower than the first threshold, that is, when battery BAT is undervoltage, control circuit 102 can control the voltage at output terminal OUT to be equal to a desired voltage by acquiring the voltage at the first terminal (e.g., at output terminal OUT) of switch $Q_{BAT}$ as voltage feedback signal Vfb, in order to normally power the additional load (not shown in FIG. 2) connected to output terminal OUT. At this time, switch $Q_{BAT}$ can be controlled to operate in a linear state (e.g., operate as a low-dropout [LDO] regulator) by controlling the driving voltage of switch $Q_{BAT}$ to generate a small constant current to charge battery BAT, in order to avoid excessive current for charging battery BAT. In addition, charging circuit 101 can also include output capacitor $C_{OUT}$, which can connect between output terminal OUT and the reference ground.

Control circuit 102 can control the power stage circuit to operate as the charge pump when detecting that port IN1 is connected to an adjustable input source (e.g., an adapter), and may generate adjustment signal Vaj according to current feedback signal Ifb or voltage feedback signal Vfb, in order to adjust voltage Vin1 generated by the first input source at port IN1 to meet the charging requirement of battery BAT. In addition, control circuit 102 can generate control signals according to the preset control logic to control the switching states of the power switches, such that the voltage conversion ratio of the charge pump is constant. Control circuit 102 can control the power stage circuit to operate as the hybrid switching converter in a buck mode when detecting that port IN2 is connected to a fixed input source (e.g., a USB power source), and may adjust the duty cycle of power switches according to current feedback signal Ifb or voltage feedback signal Vfb, in order to generate control signals to control the switching states of the power switches to meet the charging requirements of battery BAT.

When the battery is fully charged, control circuit 102 can control the power stage circuit to operate as the hybrid switching converter in a boost mode when detecting that port IN2 is connected to an external device, and may adjust the duty cycle of power switches according the voltage generated at port IN2 and the current flowing through port IN2, in order to generate control signals to control the switching states of the power switches to meet the charging requirements of external devices. Of course, if necessary, the duty cycle of the power switches also can be adjusted according to the discharge current of battery BAT, such that the discharge current does not exceed a current limit value.

Figure 3:
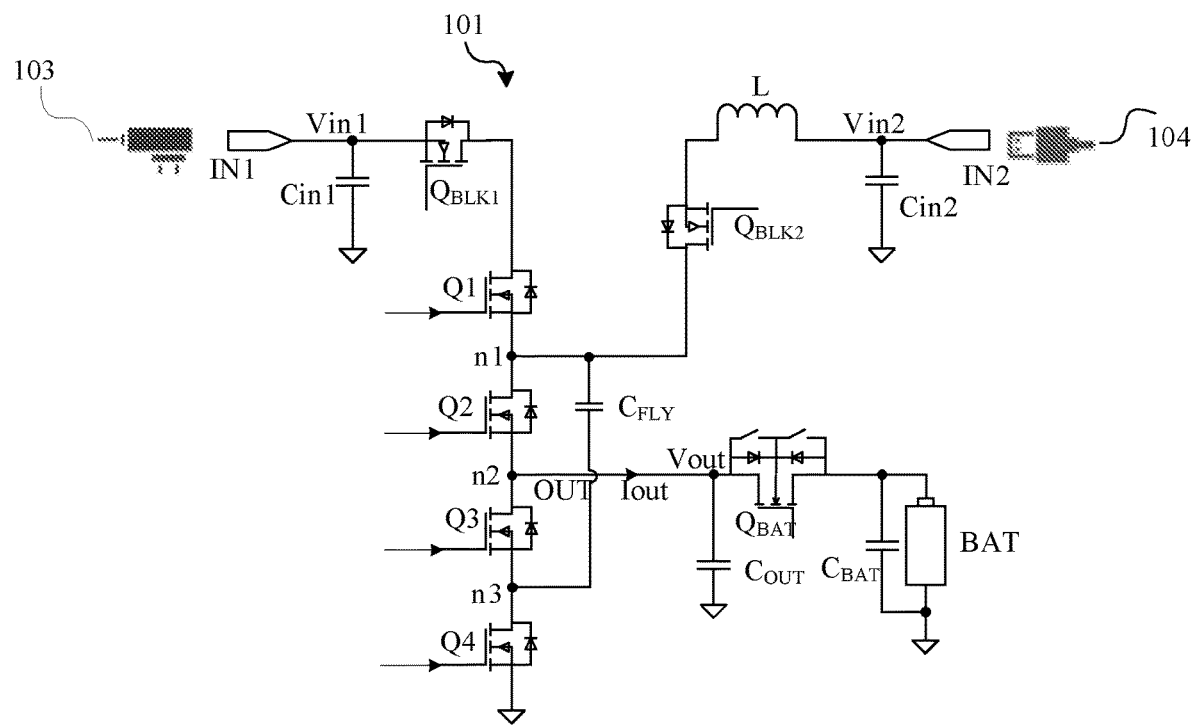
FIG. 3 is a schematic circuit diagram of a first example charging circuit, in accordance with embodiments of the present invention.

Referring now to FIG. 3, shown is a schematic circuit diagram of a first example charging circuit, in accordance with embodiments of the present invention. In this particular example, the charge pump with the voltage conversion ratio of 2:1, that is, Vin1/Vout=2, is utilized. Of course, charge pumps with other voltage conversion ratios (e.g., 3:1, 4:1, . . . , N:1, etc.) are also suitable in certain embodiments. While the charging circuit with switch $Q_{BAT}$ is exemplified herein, it should be understood that the charging circuit without switch $Q_{BAT}$ may also be applicable in certain embodiments. In this particular example, switch network 1001 can include power switches Q1-Q4 sequentially connected in series between port IN1 and the reference ground to form switch intermediate nodes n1-n3. The power stage circuit can include flying capacitor $C_{FLY}$ connected between intermediate node n1 and switch intermediate node n3. Switch intermediate node n2 can be used as output terminal OUT, and can be coupled to battery BAT. In this example, output terminal OUT can connect to battery BAT via switch $Q_{BAT}$. For example, inductor L can be coupled between port IN2 and switch intermediate node n1, and inductor L, flying capacitor $C_{FLY}$, and power switches Q2-Q4 may form the hybrid switching converter. In another example, inductor L can be coupled between port IN2 and the first end of power switch Q1, and inductor L, flying capacitor $C_{FLY}$, and power switches Q1-Q4 may form the hybrid switching converter.

The power stage circuit can also include switch $Q_{BLK1}$ connected to port IN1, and switch $Q_{BLK2}$ connected to port IN2. For example, switch $Q_{BLK1}$ can connect between port IN1 and power switch Q1, and switch $Q_{BLK2}$ can connect between the second end of inductor L and switch intermediate node n1. It should be understood that in other embodiments, switches $Q_{BLK2}$ may be connected between port IN2 and the first end of inductor L. When the power stage circuit operates as the charge pump, switch $Q_{BLK1}$ can be turned on, and switch $Q_{BLK2}$ may be turned off. When the power stage circuit operates as the hybrid switching converter, switch $Q_{BLK1}$ can be turned off, and switch $Q_{BLK2}$ may be turned on.

In this embodiment, the voltage conversion ratio of the charge pump can be controlled to remain constant, and there may be no need to adjust the duty cycle of the power switches according to the voltage feedback signal or the current feedback signal. Therefore, when the charge pump is operating, an external adjustable input source (e.g., an adapter) may need to be connected to port IN1 to meet the requirements of the charging voltage and charging current of the battery at different stages, such that the desired charging voltage and charging current can be obtained by adjusting voltage Vin1 generated by the first input source. It should be understood that other suitable control methods can also be used to control the operating states of the charge pump to adjust output voltage Vout in certain embodiments.

In this embodiment, for the hybrid switching converter, the duty cycle of the power switches may be adjusted according to the voltage feedback signal or the current feedback signal, in order to adjust output voltage Vout and output current Iout to meet the requirements of the charging voltage and charging current of the battery at different stages. It should be understood that when the external device is charged by the battery, the voltage and current at port IN2 are output voltage Vout and output current Iout adjusted by the hybrid switching converter, respectively, in order to meet the charging requirements of the external device.

Figure 4:
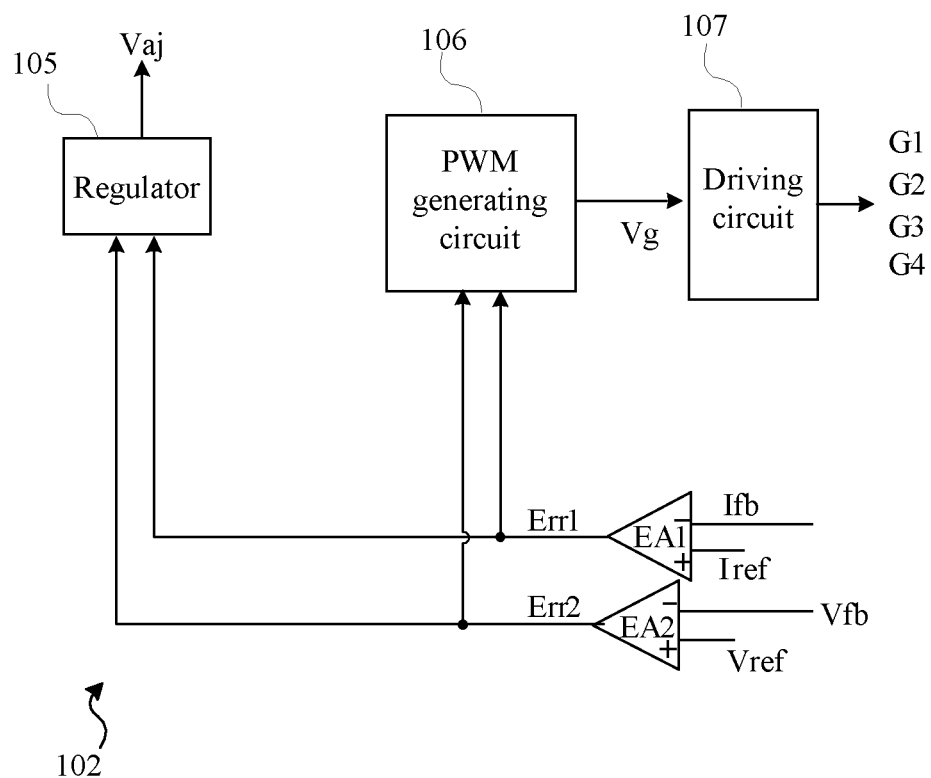
FIG. 4 is a schematic block diagram of an example control circuit, in accordance with embodiments of the present invention.

Referring now to FIG. 4, shown is a schematic block diagram of an example control circuit, in accordance with embodiments of the present invention. The control circuit will be described in detail below with reference to FIGS. 3 and 4. As shown in FIG. 4, control circuit 102 can include error amplifier EA1, error amplifier EA2, regulator 105, pulse-width modulation (PWM) generating circuit 106, and driving circuit 107. Error amplifier EA1 can generate error signal Err1 according to current reference signal Iref representing the desired value of output current Iout and current feedback signal Ifb representing output current Iout. Error amplifier EA2 can generate error signal Err2 according to voltage reference signal Vref representing the desired value of output voltage Vout and voltage feedback signal Vfb representing output voltage Vout. Regulator 105 can generate adjustment signal Vaj according to error signal Err1 or error signal Err2 when the power stage circuit operates as the charge pump, in order to adjust voltage Vin1 generated by the first input source. When the power stage circuit operates as the hybrid switching converter, regulator 105 may not operate.

In this embodiment, in the first mode, output current Iout can be controlled to be constant, and regulator 105 can generate adjustment signal Vaj according to error signal Err1 to adjust voltage Vin1 output by adapter 103 (e.g., the first input source). Thereby, output current Iout flowing through output terminal OUT of the power stage circuit may be equal to the desired charging current. In the second mode, output voltage Vout can be controlled to be constant, adjustment signal Vaj is generated according to error signal Err2 to adjust voltage Vin1 output by adapter 103, such that output voltage Vout at output terminal OUT of the power stage circuit is equal to the desired charging voltage. For example, error signal Err1 can be generated according to current feedback signal Ifb representing output current Iout flowing through output terminal OUT of the power stage circuit and current reference signal Iref, and error signal Err2 can be generated according to voltage feedback signal Vfb representing output voltage Vout at output terminal OUT of the power stage circuit and voltage reference signal Vref.

In this embodiment, adjustment signal Vaj may be positively correlated with error signal Err1 or error signal Err2. When error signal Err1 or error signal Err2 is positive and its value is larger, adjustment signal Vaj may correspondingly be larger, thereby rapidly increasing voltage Vin1 output by adapter 103 to increase the output current or voltage, and otherwise decreasing voltage Vin1 output by adapter 103 to reduce the output current or voltage. It should be understood that any other suitable battery charging control method can be applied in certain embodiments. PWM generating circuit 106 can directly generate the switching control signal Vg according to the preset control logic when the power stage circuit operates as the charge pump, in order to control the switching states of the power switches in the charge pump, such that the charge pump maintains a fixed voltage conversion ratio.

PWM generating circuit 106 can generate switching control signal Vg according to error signal Err1 or error signal Err2 to adjust the duty cycle of the power switches in the hybrid switching converter when the power stage circuit operates as the hybrid switching converter. For example, when battery BAT is charged via the hybrid switching converter, in the first mode, output current Iout can be controlled to be constant, and the duty cycle of the power switches in the hybrid switching converter may be adjusted according to error signal Err1, such that output current Iout flowing through output terminal OUT of the power stage circuit is equal to the desired charging current. In the second mode, output voltage Vout can be controlled to be constant, and the duty cycle of the power switches in the hybrid switching converter may be adjusted according to error signal Err2, such that output voltage Vout at output terminal OUT of the power stage circuit is equal to the desired charging voltage. For example, error signal Err1 can be generated according to current feedback signal Ifb representing output current Iout flowing through output terminal OUT of the power stage circuit and current reference signal Iref, and error signal Err2 can be generated according to voltage feedback signal Vfb representing output voltage Vout at output terminal OUT of the power stage circuit and voltage reference signal Vref.

When battery BAT charges the external device via the hybrid switching converter, in the first mode, output current Iout can be controlled to be constant, and the duty cycle of the power switches in the hybrid switching converter is adjusted according to error signal Err1, such that output current Iout flowing through port IN2 is equal to the desired charging current. In the second mode, output voltage Vout can be controlled to be constant, and the duty cycle of the power switches in the hybrid switching converter may be adjusted according the error signal Err2, such that output voltage Vout at port IN2 is equal to the desired charging voltage. For example, error signal Err1 can be generated according to current feedback signal Ifb representing output current Iout flowing through port IN2 and current reference signal Iref, and error signal Err2 can be generated according to voltage feedback signal Vfb representing output voltage Vout at port IN2 and voltage reference signal Vref. Of course, it can also be realized by limiting the discharge current of battery BAT. It should be understood that any suitable control method can be utilized to adjust the duty cycle of the power switches in the hybrid switching converter (e.g., comparing the error signal with a ramp signal to generate a PWM control signal, or using a fixed on-time to adjust the off-time to adjust the switching frequency) in certain embodiments.

Drive circuit 107 can generate control signals G1-G4 of power switches Q1-Q4 according to switching control signal Vg. When the power stage circuit operates as the charge pump, switching control signal Vg is the preset control logic and may not be affected by error signal Err1 or error signal Err2; that is, control signals G1-G4 of power switches Q1-Q4 may remain unchanged. When the power stage circuit operates as the hybrid switching converter, switching control signal Vg can change according to the change of error signal Err1 or error signal Err2. In this example, by integrating both the charge pump and the hybrid switching converter in the power stage circuit, different modes can be adopted in different charging occasions, thereby ensuring that the charging system has good efficiency without adding additional power devices.

Figure 5:
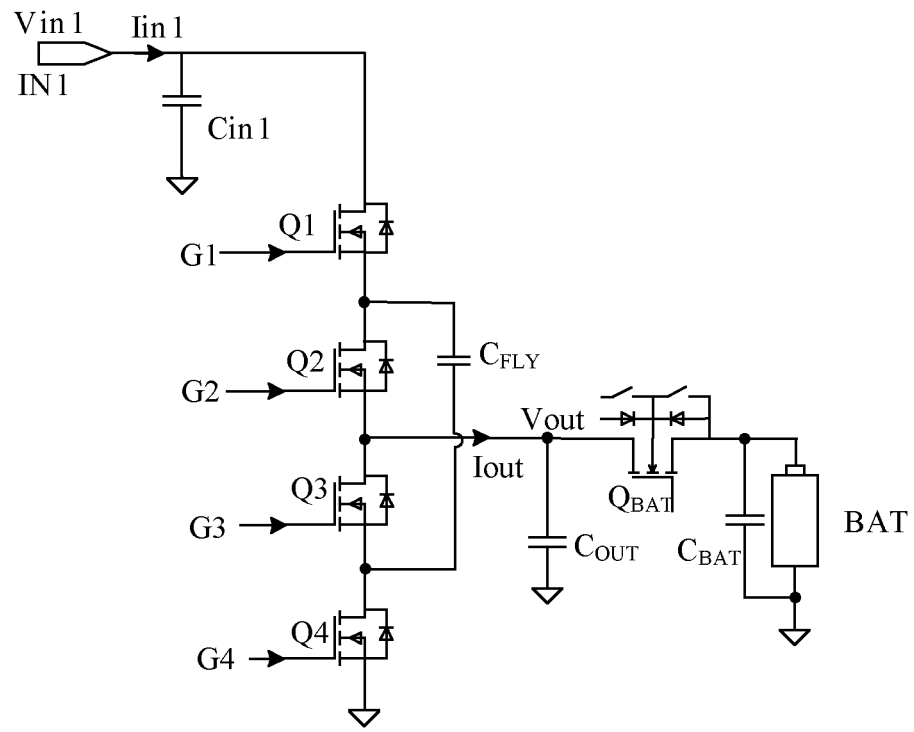
FIG. 5 is a schematic circuit diagram of the first example charging circuit in a first state, in accordance with embodiments of the present invention.

Referring now to FIG. 5, shown is a schematic circuit diagram of the first example charging circuit in a first state, in accordance with embodiments of the present invention. In this particular example, in the first state, switch $Q_{BLK2}$ can be turned off, thereby blocking the influence of voltage VIN1 output by the first input source and other voltages in the charging circuit on port IN2, and switch $Q_{BLK1}$ may be turned on, such that the charging circuit is a charge pump that receives voltage VIN1 output by the first input source, and can include power switches Q1-Q4 and flying capacitor $C_{FLY}$. In this example, a general control logic can control the charge pump; that is, the control signals of power switches Q2 and Q4 are the same, the control signals of power switches Q1 and Q3 are the same, and the phase difference between the control signals of power switch Q1 and power switch Q2 is 180°. Therefore, the charge pump may have two stages of operation. In the first stage, power switches Q1 and Q3 can be turned on, and power switches Q2 and Q4 may be turned off. In this stage, flying capacitor $C_{FLY}$ can connect in series with output capacitor $C_{OUT}$; that is, Vin1−$V_{CFLY}$=Vout. In the second stage, power switches Q2 and Q4 can be turned on, and power switches Q1 and Q3 may be turned off. In this stage, flying capacitor $C_{FLY}$ can connect in parallel with output capacitor $C_{OUT}$; that is, $V_{CFLY}$=Vout. Thus, it can be concluded that: $V_{CFLY}$=Vout=(½)*Vin1, and Iout=2*Iin1.

Figure 6A:
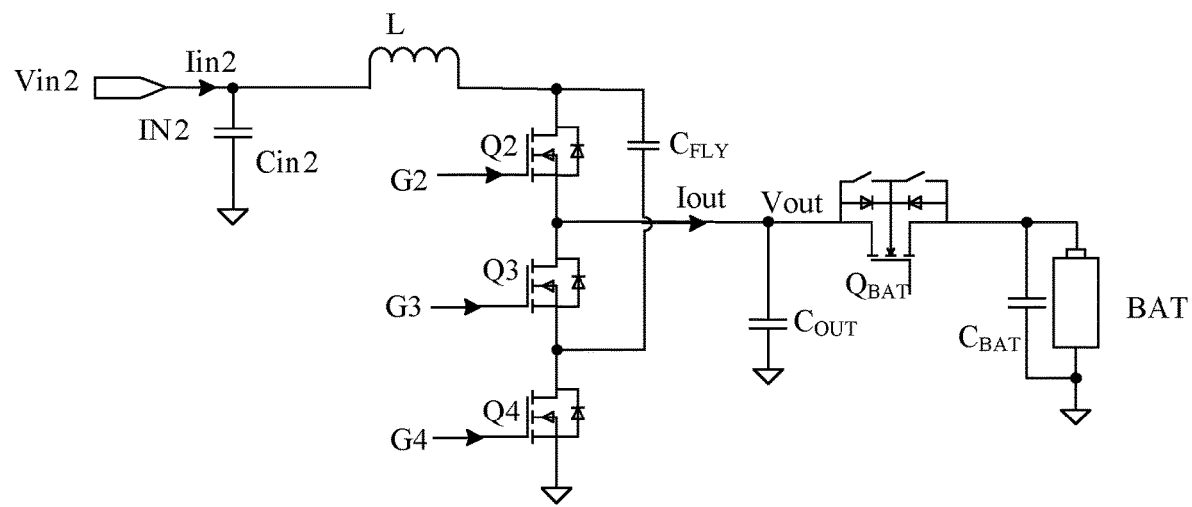
FIGS. 6A and 6B are schematic circuit diagrams of the first example charging circuit in a second state, in accordance with embodiments of the present invention.
Figure 6B:
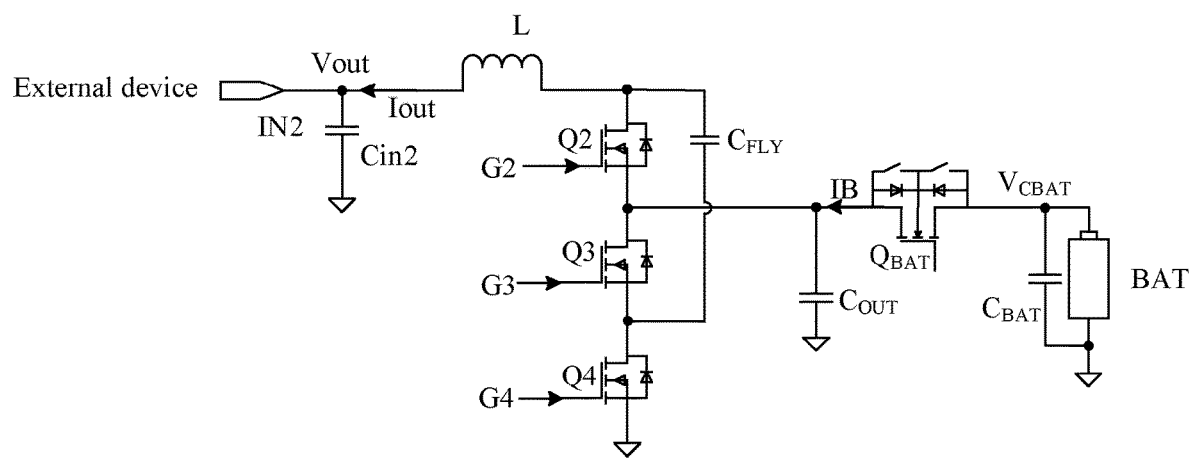

Referring now to FIGS. 6A and 6B, shown are schematic circuit diagrams of the first example charging circuit in a second state, in accordance with embodiments of the present invention. In the second state, switch $Q_{BLK1}$ can be turned off, thereby blocking the influence of voltage VIN2 output by the second input source and other voltages in the charging circuit on port IN1, and switch $Q_{BLK2}$ may be turned on, such the charging circuit is a hybrid switching converter, that can include inductor L, power switches Q2-Q4, and flying capacitor $C_{FLY}$. In this example, power switch Q1 can be controlled to be off in this state.

According to the different components connected to port IN2, the hybrid switching converter may have two operating modes. When port IN2 is connected to the second input source, output voltage Vout can be the voltage on output capacitor $C_{OUT}$, and output current Iout the current flowing to battery BAT, as shown in FIG. 6A. At this time, the hybrid switching converter may operate in the buck mode. When port IN2 is connected to an external device, battery BAT can be used as an input source, output voltage Vout may be the voltage on input capacitor Cin2, output current Iout can be the current flowing to port IN2, and battery BAT may be discharged to charge the external device, as shown in FIG. 6B. At this time, the hybrid switching converter may operate in the boost mode.

Figure 7:
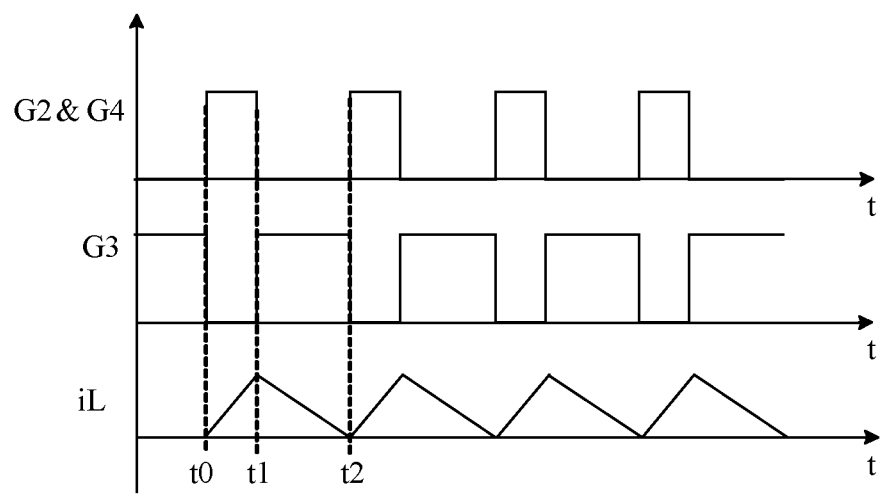
FIG. 7 is a waveform diagram of example operation of the first example charging circuit in the second state, in accordance with embodiments of the present invention.

Referring now to FIG. 7, shown is a waveform diagram of an example operation of the first example charging circuit in the second state, in accordance with embodiments of the present invention. The operating principle of the hybrid switching converter will be described in detail below with reference to FIGS. 6 and 7. As shown in FIG. 7, in the second state, control signals G2 and G4 of power switches Q2 and Q4 are the same, and the duty cycle is D. Control signal G3 of power switch Q3 can be complementary to control signals G2 and G4 (e.g., power switch Q3 and power switch Q2 (or Q4) are turned on alternately).

There are two stages when the hybrid switching converter operates in the buck mode. As shown in FIG. 6A, in first stage t0-t1, power switches Q2 and Q4 can be turned on, power switch Q3 turned off, and flying capacitor $C_{FLY}$ can connect in parallel with output capacitor $C_{OUT}$ and capacitor $C_{BAT}$; that is, $V_{CFLY}$=Vout. In addition, in first stage t0-t1, the second input source may store energy in inductor L, and inductor current iL can increase. In second stage t1-t2, power switches Q2 and Q4 can be turned off, power switch Q3 may be turned on, and flying capacitor $C_{FLY}$ can connect in series with output capacitor $C_{OUT}$. In second stage t1-t2, inductor L may release energy and inductor current iL can decrease. Combining the above two stages, according to the volt-second balance principle of inductor L, the following Formula (1) can be obtained.

$$(Vin2-Vout) \times D + (Vin2-2Vout) \times (1-D) = 0 \quad (1)$$

From Formula (1), it can be concluded that: Vout/Vin2=1/(2−D), where D is the duty cycle of power switches Q2 and Q4. That is, the variation range of output voltage Vout is 0.5Vin2~Vin2. In addition, it can also be concluded that: Iout/Iin2=2−D; that is, the variation range of output current Iout is Iin2~2Iin2.

There are also two stages when the hybrid switching converter operates in the boost mode. As shown in FIG. 6B, in first stage t0-t1, power switches Q2 and Q4 can be turned on, power switch Q3 may be turned off, and flying capacitor $C_{FLY}$ can connect in parallel with output capacitor $C_{OUT}$ and capacitor $C_{BAT}$. As such, the voltage $V_{CFLY}$ across flying capacitor $C_{FLY}$ is equal to voltage $V_{CBAT}$ across capacitor $C_{BAT}$; that is, $V_{CFLY}=V_{CBAT}$. In addition, in first stage t0-t1, battery BAT may store energy in inductor L, and inductor current iL can increase. In second stage t1-t2, power switches Q2 and Q4 can be turned off, power switch Q3 may be turned on, and flying capacitor $C_{FLY}$ can connect in series with capacitor $C_{BAT}$. In second phase t1-t2, inductor L may release energy and inductor current iL can decrease. Combining the above two stages, according to the volt-second balance principle of inductor L, the following Formula (2) can be obtained.

$$(V_{CBAT}-Vout) \times D + (V_{CBAT}+V_{CFLY}-Vout) \times (1-D) = 0 \quad (2)$$

From Formula (2), it can be concluded that: Vout=(2−D)×$V_{CBAT}$, where D is the duty cycle of power switches Q2 and Q4. That is, the variation range of output voltage Vout is $V_{CBAT}$~2$V_{CBAT}$. In addition, it can also be concluded that: Iout/IB=1/(2−D); that is, the variation range of output current Iout is 0.5IB~IB.

Figure 8:
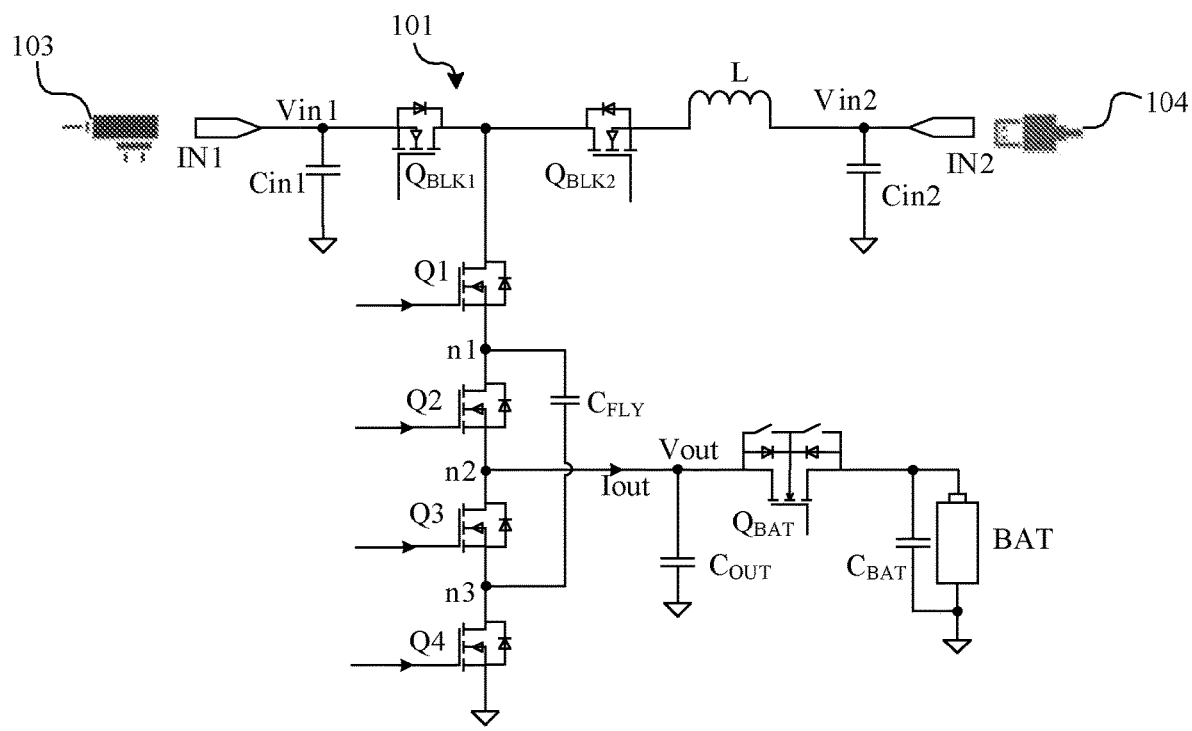
FIG. 8 is a schematic circuit diagram of a second example charging circuit, in accordance with embodiments of the present invention.

Referring now to FIG. 8, shown is a schematic circuit diagram of a second example charging circuit, in accordance with embodiments of the present invention. In this particular example, inductor L can be coupled between port IN2 and the first end of power switch Q1 (e.g., between port IN2 and switch $Q_{BLK2}$). The structure and composition of the rest of the charging circuit are substantially the same as those in the example of FIG. 3. In addition, when the structure of the charging circuit is as shown in FIG. 8, the operating principle of the charge pump is substantially the same as the above, and the operating principle of the hybrid switching converter is slightly different. When the charging circuit operates as the hybrid switching converter, power switch Q1 may always be controlled to be in an on state, and the switching states of power switches Q2-Q4 can be the same as those in the charging circuit shown in FIG. 3, which does not affect the operation of hybrid switching converter.

The charging system according to the particular embodiments can include a dual-input charging circuit, which can operate as the charge pump when an adjustable input source is input, and may operate as the switching converter when a fixed input source is input to get higher efficiency. In addition, the charging system has fewer power switches than other approaches, thereby reducing system cost. In particular embodiments, the power switch can use any suitable electrically controllable switching devices, such as metal-oxide-semiconductor field-effect transistors (MOSFET), bipolar-junction transistors (BJT), or insulated-gate bipolar transistor (IGBT).

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A charging circuit, comprising:
    a) a first port for receiving a first input source;
    b) a second port coupled to a second input source or an external device;
    c) a third port coupled to a battery;
    d) a power stage circuit configured to operate as a charge pump in a first state, and to operate as a hybrid switching converter in a second state, wherein the hybrid switching converter and the charge pump share at least part of the plurality of power switches; and
    e) wherein the charge pump is coupled between the first port and the third port to charge the battery, and wherein a charging path from the first port to the battery has no inductor therein.

2. The charging circuit according to claim 1, wherein when in the first state, the first port is coupled to the first input source, and the power stage circuit is controlled to operate as the charge pump, in order to charge the battery coupled to an output terminal of the power stage circuit.

3. The charging circuit according to claim 1, wherein in the second state, the hybrid switching converter operates in a buck or boost mode.

4. The charging circuit according to claim 3, wherein when the second port is coupled to the second input source, the power stage circuit is controlled to operate as the hybrid switching converter, and the hybrid switching converter operates in the buck mode to charge the battery coupled to an output terminal of the power stage circuit.

5. The charging circuit according to claim 3, wherein when the second port is coupled to the external device, the power stage circuit is controlled to operate as the hybrid switching converter, and the hybrid switching converter operates in the boost mode, such that the battery coupled to an output terminal of the power stage circuit charges the external device.

6. The charging circuit according to claim 1, wherein the first input source generates an adjustable voltage, and the second input source generates a fixed voltage.

7. The charging circuit according to claim 1, wherein the power stage circuit comprises:
    a) a switch network having the plurality of power switches are coupled in series between the first port and a reference ground, in order to form a plurality of switch intermediate nodes that are common nodes between the power switches; and
    b) at least one flying capacitor having two ends respectively coupled to corresponding switch intermediate nodes.

8. The charging circuit according to claim 7, wherein the at least one flying capacitor and the switch network form the charge pump.

9. The charging circuit according to claim 8, wherein the charge pump receives the first input source that generates adjustable voltage, and switching states of the power switches in the charge pump are controlled to make a voltage conversion ratio of the charge pump to be fixed, such that output signals generated by the charge pump are adjusted by adjusting a voltage generated at the first port to meet charging requirements.

10. The charging circuit according to claim 7, wherein:
   a) the power stage circuit comprises an inductor coupled between the second port and the switch network; and
   b) the inductor, the at least one flying capacitor, and at least part of power switches in the switch network form the hybrid switching converter.

11. The charging circuit according to claim 10, wherein output signals of the hybrid switching converter are adjusted by adjusting duty cycles of the power switches in the hybrid switching converter to meet charging requirements.

12. The charging circuit according to claim 1, wherein the charging circuit further comprises:
   a) a first switch coupled to the first port, and being configured to be turned on in the first state and turned off in the second state; and
   b) a second switch coupled to the second port, and being configured to be turned on in the second state and turned off in the first state.

13. The charging circuit according to claim 1, wherein the power stage circuit comprises:
   a) a switch network having a first power switch, a second power switch, a third power switch, and a fourth power switch that are connected in series between the first port and a reference ground to form three switch intermediate nodes that are common nodes between the power switches;
   b) a flying capacitor coupled between a first switch intermediate node and a third switch intermediate node;
   c) an output terminal coupled to a second switch intermediate node and the battery; and
   d) wherein the flying capacitor and the switch network form the charge pump.

14. The charging circuit according to claim 13, wherein when the first port is coupled to the first input source, the power stage circuit operates as the charge pump, control signals of the second and fourth power switches are the same, control signals of the first and third power switches are the same, and a phase difference between control signals of the first and second power switches is 180°.

15. The charging circuit according to claim 13, wherein:
   a) the power stage circuit comprises an inductor coupled between the second port and the first switch intermediate node; and
   b) the inductor, the flying capacitor, the second power switch, the third power switch and the fourth power switch form the hybrid switching converter.

16. The charging circuit according to claim 15, wherein when the power stage circuit operates as the hybrid switching converter, the first power switch is always turned off, switching states of the second and fourth power switches are the same, and switching states of the second and fourth power switches are complementary to a switching state of the third power switch.

17. The charging circuit according to claim 13, wherein:
   a) the power stage circuit comprises an inductor coupled between the second port and a first end of the first power switch; and
   b) the inductor, the flying capacitor, the first power switch, the second power switch, the third power switch, and the fourth power switch form the hybrid switching converter.

18. The charging circuit according to claim 17, wherein when the power stage circuit operates as the hybrid switching converter, the first power switch is always turned on, switching states of the second and fourth power switches are the same, and switching states of the second and fourth power switches are complementary to a switching state of the third power switch.

19. The charging circuit according to claim 1, further comprising:
   a) a third switch coupled between an output terminal of the power stage circuit and the battery;
   b) wherein when a battery voltage of the battery is higher than a first threshold, the third switch is controlled to be fully turned on; and
   c) when the battery voltage is lower than the first threshold, the third switch is controlled in a linear operation state to limit a current for charging the battery.

20. The charging circuit according to claim 2, wherein:
   a) when the battery is charged via the charge pump, an adjustment signal is generated according a first error signal to adjust a voltage output by the first input source in a first mode, in order as to adjust an output current at the output terminal of the power stage circuit;
   b) the adjustment signal is generated according a second error signal to adjust the voltage output by the first input source in a second mode, in order to adjust an output voltage at the output terminal of the power stage circuit;
   c) the first error signal is generated according to a current feedback signal representing the output current at the output terminal of the power stage circuit and a current reference signal representing a desired output current; and
   d) the second error signal is generated according to a voltage feedback signal representing the output voltage at the output terminal of the power stage circuit and a voltage reference signal representing a desired output voltage.

* * * * *